United States Patent
Gao et al.

(10) Patent No.: US 11,385,898 B2
(45) Date of Patent: Jul. 12, 2022

(54) TASK ORCHESTRATION METHOD FOR DATA PROCESSING, ORCHESTRATOR, DEVICE AND READABLE STORAGE MEDIUM

(71) Applicant: MICROFUN CO., LTD, Beijing (CN)

(72) Inventors: Chi Gao, Beijing (CN); Yifan Li, Beijing (CN)

(73) Assignee: MICROFUN CO., LTD, Beijing (CN)

( * ) Notice: Subject to any disclaimer, the term of this patent is extended or adjusted under 35 U.S.C. 154(b) by 386 days.

(21) Appl. No.: 16/695,483

(22) Filed: Nov. 26, 2019

(65) Prior Publication Data

US 2021/0034365 A1  Feb. 4, 2021

(30) Foreign Application Priority Data

Aug. 1, 2019  (CN) .......................... 201910705348.3

(51) Int. Cl.
| | |
|---|---|
| *G06F 9/46* | (2006.01) |
| *G06F 9/38* | (2018.01) |
| *G06F 16/22* | (2019.01) |
| *G06F 16/23* | (2019.01) |
| *G06F 9/48* | (2006.01) |
| *G06F 9/50* | (2006.01) |

(52) U.S. Cl.
CPC .......... *G06F 9/3838* (2013.01); *G06F 9/4881* (2013.01); *G06F 9/5061* (2013.01); *G06F 16/2246* (2019.01); *G06F 16/2358* (2019.01)

(58) Field of Classification Search
CPC .............. G06F 9/3838; G06F 16/2246; G06F 16/2358; G06F 9/4881; G06F 9/5061
See application file for complete search history.

(56) References Cited

U.S. PATENT DOCUMENTS 6,014,670 A * 1/2000 Zamanian ............. G06F 16/254
9,171,102 B1 * 10/2015 Zlatnik ............... G06F 16/9024

* cited by examiner

*Primary Examiner* — Wissam Rashid
(74) *Attorney, Agent, or Firm* — Maier & Maier, PLLC

(57) ABSTRACT

The present disclosure provides a method for task orchestrating, an orchestrator, a device and a readable storage medium. According to the method provided in the present disclosure, task scripts are edited as descriptive language scripts, and data dependency relationships between source tables and target tables in the tasks corresponding to the task scripts are automatically generated according to the descriptive language scripts of the tasks. The execution of the tasks is driven in a data-driven manner according to the data dependency relationships between the source tables and the target tables in the tasks. There is no need for a technical person to manually edit the workflow file. When some tasks change, the data dependency relationships between the source and target tables in the tasks can be automatically updated according to the task scripts, without affecting the orchestration process between tasks.

17 Claims, 4 Drawing Sheets

TASK ORCHESTRATION METHOD FOR DATA PROCESSING, ORCHESTRATOR, DEVICE AND READABLE STORAGE MEDIUM

CROSS-REFERENCE TO RELATED APPLICATION

This application claims priority to Chinese Patent Application No. 201910705348.3, filed on Aug. 1, 2019, which is hereby incorporated by reference in its entirety.

TECHNICAL FIELD

The present disclosure relates to the technical field of big data, in particular, to a method for task orchestrating, an orchestrator, a device and a readable storage medium.

BACKGROUND

On a big data platform, the most important links are those for processing collected original data, including cleaning, organizing, sorting, summarizing, and the like. In most cases, these links cannot be achieved in one step. For example, there are various sources of the original data itself, and each source has a different format and requires different preprocessing. Therefore, a data processing manner of the big data platform is generally referred to as "pipeline", where generally, a program or service is used to arrange various links in the pipeline to be executed regularly, or to be executed sequentially according to a process. Such program or service is generally referred to as a scheduler or an orchestrator, and each link in the pipeline is referred to as a task.

Currently, the tasks are arranged through a workflow manner. A technical person pre-writes a workflow file that can represent dependency relationships between the various tasks in the pipeline, and the orchestrator arranges the tasks to be executed in order based on the dependency relationships according to the workflow file. Common orchestrators include Oozie and Luigi, where the Oozie has an Eclipse plugin that can be used for visual editing of workflows and the Luigi does not have a visual editor and the workflow is defined using a pure code manner.

However, whether it is the pure code manner or the visual editing manner, the workflow is defined manually by the technical person. If some tasks change during the course, for example, one task is rewritten as multiple tasks, or multiple tasks are merged into one task, or some new tasks are added, the person skilled in the art is required to manually re-edit or adjust the workflow. Inevitably, the workflow will be erroneous due to a manual operation error, and the new workflow needs to be re-tested. The editing and testing of the workflow takes a lot of time and the efficiency of the task orchestrating is low.

SUMMARY

The present disclosure provides a method for task orchestrating, an orchestrator, a device and a readable storage medium, in order to solve the problem that in the prior art, the workflow is defined manually by the technical person, if some tasks change during the course, the person skilled in the art is required to manually re-edit or adjust the workflow, where inevitably, the workflow will be erroneous due to a manual operation error, and the new workflow needs to be re-tested, and the editing and testing of the workflow takes a lot of time and the efficiency of the task orchestrating is low.

An aspect of the present disclosure provides a method for task orchestrating, including:
acquiring task scripts, where the task scripts are descriptive language scripts;
automatically generating data dependency relationships between source tables and target tables in tasks corresponding to the task scripts, according to the task scripts; and
driving execution of the tasks in a data-driven manner, according to the data dependency relationships between the source tables and the target tables of the tasks.

Another aspect of the present disclosure provides an orchestrator, including:
a task script acquiring module, configured to acquire task scripts, where the task scripts are descriptive language scripts; and
a dependency relationship generating module, configured to automatically generate data dependency relationships between source tables and target tables in tasks corresponding to the task scripts, according to the task scripts; and
a task driving module, configured to drive execution of the tasks in a data-driven manner, according to the data dependency relationships between the source tables and the target tables of the tasks.

Another aspect of the present disclosure provides a device for task orchestrating, including:
a processor, a memory, and a computer program stored and executable on the memory; where, the processor, when executing the computer program, implements the method as described above.

Another aspect of the present disclosure provides a computer readable storage medium having a computer program stored thereon, where the computer program, when being executed by the processor, implements the method for task orchestrating as described above.

According to the method for task orchestrating, the orchestrator, the device and the readable storage medium provided by the present disclosure, the task scripts are edited as descriptive language scripts, and the data dependency relationships between the source tables and the target tables in the tasks corresponding to the task scripts are automatically generated according to the descriptive language scripts of the tasks. The execution of the tasks is driven in a data-driven manner according to the data dependency relationships between the source tables and the target tables in the tasks. There is no need for a technical person to manually edit the workflow file. When some tasks change, the data dependency relationships between the source and target tables in the tasks can be automatically updated according to the task script, without affecting the orchestration process between tasks, and there is no need to re-perform the task orchestration test, which improves the efficiency of the task orchestrating.

Figure 1:
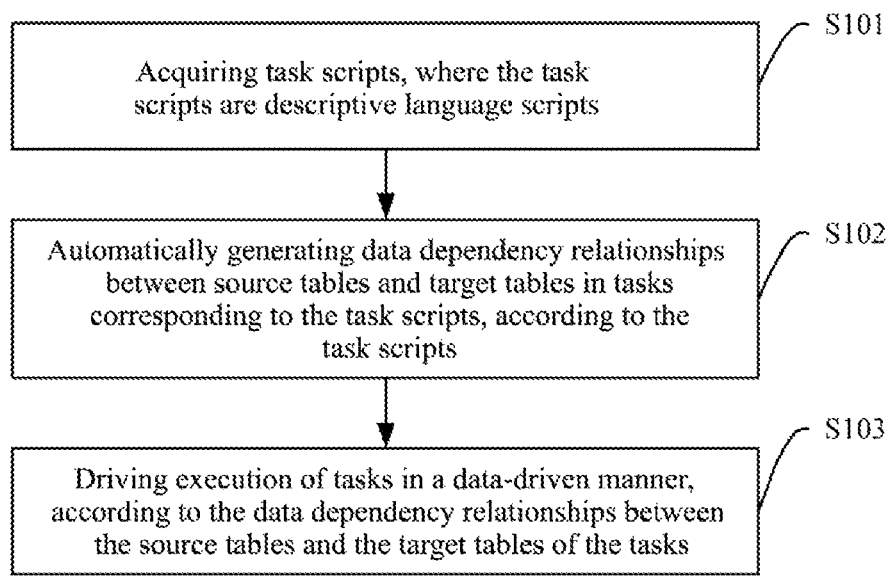
FIG. 1 is a flowchart of a method for task orchestrating according to Embodiment 1 of the present disclosure.

Specific embodiments of the present disclosure are illustrated through the above-mentioned drawings, and a more detailed description thereof will be described later. The drawings and description are not intended, by any means, to limit the scope of the conception of the present disclosure, instead, they are intended to illustrate the concepts of the present disclosure for those skilled in the art by referring to the specific embodiments.

DESCRIPTION OF EMBODIMENTS

Exemplary embodiments will be described in detail herein, examples of which are illustrated in the drawings. Unless otherwise indicated, same numerals in different drawings indicate the same or similar elements, when the drawings are referred to in the following description. Implementations described in the following exemplary embodiments do not represent all implementations consistent with the embodiments of the disclosure. Instead, they are merely examples of apparatuses and methods consistent with some aspects of the embodiments of the disclosure as detailed in the appended claims.

The terms "first", "second", and the like, which are referred to in the embodiments of the present disclosure, are only used for the purpose of description, and they cannot be construed as indicating or implying a relative importance or implicitly indicating the number of technical features indicated. In the following description of the respective embodiments, the meaning of "a plurality of" is two or more, unless specifically defined otherwise.

The disclosure is specifically applied to an orchestrator in a big data platform for task orchestrating. A technical person pre-edits a descriptive language script of each task, for example a SQL script, or a descriptive language script similar to the SQL script such as a Pig script. The orchestrator automatically generates data dependency relationship between a source table and a target table in the tasks according to the descriptive language script of the tasks. The source table refers to an input data table of the tasks, and the target table refers to an output data table of the tasks, that is, a data table of the data changed due to the execution of the tasks. And then the execution of the tasks is triggered in a data-driven manner. For example, when the data in a source table data partition that serves as the input data of the task changes, the execution of the task is triggered. The execution of the task causes the data of a target table data partition to change. The target table data partition will be used as the next source table data partition, which will continue to trigger the execution of the next task.

Technical solutions of the present disclosure and how the technical solutions of the present application solve the above technical problems will be described in detail below with reference to specific embodiments. The following specific embodiments may be combined with each other, and the same or similar concepts or processes may not be repeated in some embodiments. Embodiments of the present disclosure will be described below with reference to the drawings.

Embodiment 1

FIG. 1 is a flowchart of a method for task orchestrating according to Embodiment 1 of the present disclosure. In this embodiment, a method for task orchestrating is provided for the problem that in the prior art, the workflow is defined manually by the technical person, if some tasks change during the course, the technical person is required to manually re-edit or adjust the workflow, where inevitably, the workflow will be erroneous due to an manual operation error, and the new workflow needs to be re-tested, and the editing and testing of the workflow takes a lot of time and the efficiency of the task orchestrating is low.

The method according to the present embodiment is applied to an orchestrator, where the orchestrator can be installed on a server in a big data platform. In other embodiments, the method can also be applied to other devices. This embodiment is schematically illustrated by taking the orchestrator as an example.

As shown in FIG. 1, the method is specifically as the following:

Step S101: acquiring task scripts, where the task scripts are descriptive language scripts.

The currently existing orchestrators generally support multiple task types, for example, computing frameworks such as HIVE, MapReduce, and Pig, which are often used on the Hadoop big data platform, as well as general tasks, such as Shell, Java, and Data Copy. However, from the perspective of daily application, the vast majority of tasks are HIVE processing tasks that are based on SQL language, and the SQL language is the most common language for data processing. Therefore, a core process of data processing can include only the SQL language, or a similar descriptive language such as Pig.

In this embodiment, a descriptive language script is pre-edited for each task. For example, the SQL script, or a descriptive language script similar to SQL, such as the Pig script.

Specifically, for a SQL-type task, the SQL script for the task can be directly edited. The business logic of the task itself defines the input and output of the task.

For a non-SQL-type task whose programs can only be written using a non-SQL language, for example, a MapReduce task, or Java, Shell programs and the like, programs of the data processing logic are embedded into SQL scripts as functions, data serilizer/data deserilizer of the SQL scripts, and then these functions are invoked in SQL scripts to define the non-SQL-type tasks. And the scripts for non-SQL-type tasks will not be edited separately. In this way, each task script is edited as a SQL script.

Illustratively, the task script in this embodiment may be manually written and uploaded by a technical person to an orchestrator device.

Step S102: automatically generating data dependency relationships between source tables and target tables in tasks corresponding to the task scripts, according to the task scripts.

In this embodiment, a corresponding syntax tree may be generated through a syntax parser according to the descriptive language script of a task. The source table and the target table involved in the task, as well as a data partition of the source table involved in the input data of the task and a data partition of the target table involved in the output data of the task may be determined according to the syntax tree of the task script. And further, the data dependency relationship between the data partition of the source table and the data partition of the target table may be determined.

Step S103: driving execution of the tasks in a data-driven manner, according to the data dependency relationships between the source tables and the target tables of the respective tasks.

In this embodiment, the tasks are not orchestrated in a manner of defining a workflow, instead, a data-driven manner is used to trigger execution of respective tasks to implement the task orchestrating.

For each task, when the data in the data partition of the source table of the task changes, it means that the input data of the task is ready, which triggers the execution of the task. And the execution of the task causes the data in the data partition of the target table to change, and the data partition of the target table will be used as a data partition of a source table of a next task, which continues to trigger the execution of the next task.

In this embodiment, after the data dependency relationships between the data partitions of the source tables and the data partitions of the target tables of all of the tasks are generated, the data dependency relationships between the data partitions of the source tables and the data partitions of the target tables of all of the tasks can form a data-driven trigger chain. The beginning of the trigger chain is original data. When the original data is in place, execution of a first stage task is triggered. The execution of the first stage task causes the data partition of the target table to change, which triggers execution of a second stage task, and so on. As such, the orchestration and execution of the tasks are achieved.

Illustratively, for the triggering of the first stage task, an external trigger manner may be adopted. The orchestrator may provide an upload service for uploading the original data, and when the original data is uploaded, the execution of the first stage task is triggered.

Optionally, the original data in a specified directory may be monitored, and when the original data is completely stored in the specified directory, or when a change of the original data in the specified directory is monitored, the execution of the first stage task is triggered; or, the original data is uploaded to a specified data table, and the execution of the first level task is triggered by monitoring a data change in the specified data table; or, when the original data is uploaded, a trigger signal of the first stage task is directly transmitted to the orchestrator, and after receiving the trigger signal, the orchestrator triggers the execution of the first stage task, and the like.

In this embodiment of the present disclosure, task scripts are edited as descriptive language scripts, and the data dependency relationships between the source tables and the target tables in the tasks are generated according to the descriptive language scripts of the tasks. The execution of the tasks is driven in a data-driven manner according to the data dependency relationships between the source tables and the target tables in the tasks. There is no need for a technical person to manually edit a workflow file. When some tasks change, the data dependency relationships between the source and target tables in the tasks can be automatically updated according to the task scripts, without affecting the orchestration process between the tasks, and there is no need to re-perform the task orchestration test, which improves the efficiency of the task orchestrating.

Embodiment 2

Figure 2:
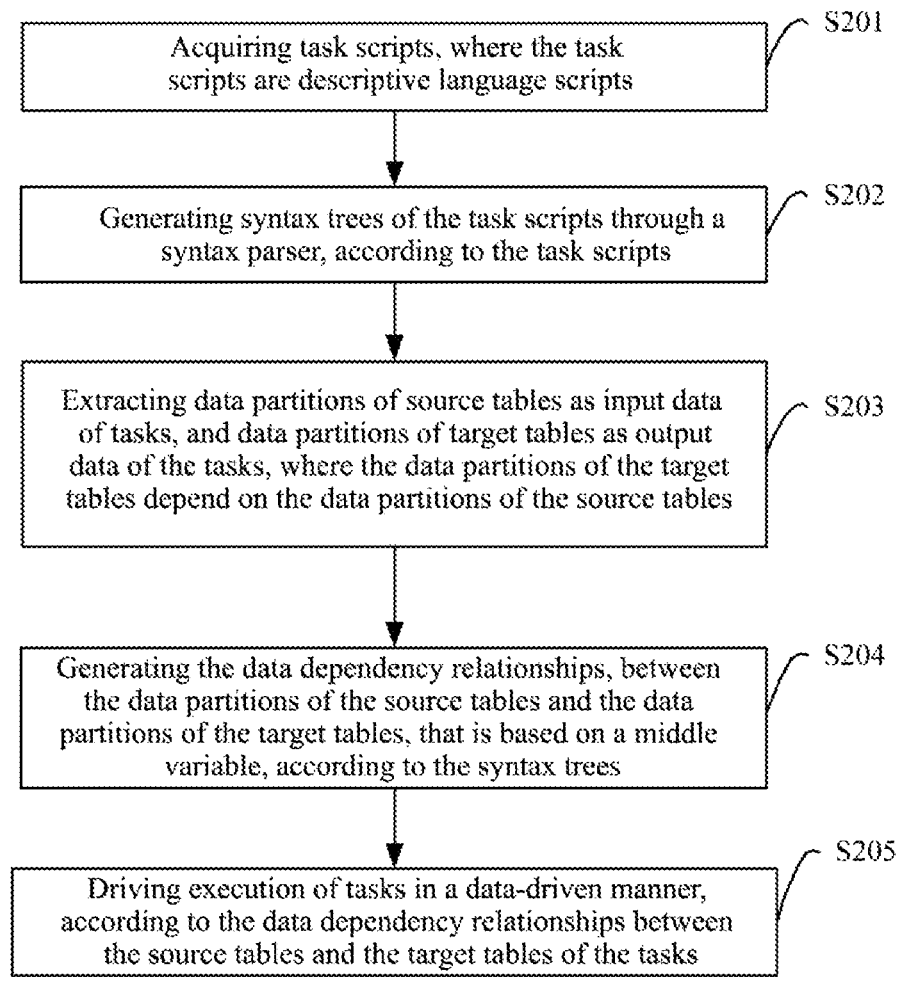
FIG. 2 is a flowchart of a method for task orchestrating according to Embodiment 2 of the present disclosure.

FIG. 2 is a flowchart of a method for task orchestrating according to Embodiment 2 of the present disclosure. On the basis of the above Embodiment 1, in this embodiment, the automatically generating data dependency relationships between source tables and target tables in tasks, according to the task scripts includes: extracting, from syntax trees of the task scripts, data partitions of the source tables that serve as input data of the corresponding tasks, and data partitions of the target tables that serve as output data of the corresponding tasks, where the data partitions of the target tables depend on the data partitions of the source tables; generating the data dependency relationships between the data partitions of the source tables and the data partitions of the target tables that are based on a middle variable, according to the syntax tree. As shown in FIG. 2, the method is specifically as the following:

Step S201: acquiring task scripts, where the task scripts are descriptive language scripts.

In this embodiment, the descriptive language scripts of the tasks are pre-edited. For example, a SQL script, or a descriptive language script similar to SQL, such as or the Pig script.

Specifically, for a SQL-type task, the SQL script for the task can be directly edited. The business logic of the task itself defines the input and output of the task.

For a non-SQL-type task whose programs can be written using a non-SQL language, for example, a MapReduce task, or programs such Java, Shell, programs of these data processing logic are embedded into a SQL script as functions, data serilizer/data deserilizer of the SQL scripts, and then these functions are invoked in the SQL script to define the non-SQL-type task. And the script for non-SQL-type task will not be edited separately. In this way, each task script is edited as a SQL script.

Illustratively, the task scripts in this embodiment may be manually written and uploaded by a technical person to a orchestrator device.

In this embodiment, through the following steps S202 to S204, the data dependency relationships between source tables and target tables in tasks are automatically generated according to the task scripts.

Step S202: generating syntax trees of the task scripts through a syntax parser, according to the task scripts.

In this embodiment, the generating syntax trees of the task scripts according to the task scripts may be implemented using any one of the syntax parsers in the prior art, which will not be detailed herein.

Step S203: extracting data partitions of source tables as input data of tasks, and data partitions of target tables as output data of the tasks, where the data partitions of the target tables depend on the data partitions of the source tables.

The descriptive language scripts of the tasks, such as SQL scripts, whose business logic itself defines the data tables corresponding to the input and output of tasks, are well suited for automatic orchestration. The source tables and the target tables of the tasks, the data partitions of the source tables serving as the input data of the tasks, and the data partitions of the target tables serving as the output data of the tasks may be determined. Since the data tables are generally quite big, and in each task, only a part of the data is processed according to a parameter definition, it is necessary to determine the data in which data partitions in the source tables are to be read, and to determine data in which data partitions in the target tables are to be changed.

For example, for a SQL script as shown in Table 1 below, the input of the task is from a table data0, and the output is inserted to a table data1.

TABLE 1 insert overwrite table data1 partition ('date' = '${hivevar:date}')
select
    user_id,
    count(*) cnt TABLE 1-continued

```
from data0
where 'date' between date_sub('${hivevar:date}', 5) and
'${hivevar:date}'
group by
    user_id
```

In the SQL script shown in Table 1, data of the days from "date_sub('${hivevar:date}', 5)" to "${hivevar:date}" in the table data0 are read out, the number of occurrences of each individual user_id are calculated, and the results are written into the data partition of the day "${hivevar:date}" in the table data1. "date_sub(date,y)" means subtracting a specified time interval from a data "data", and "date_sub('${hivevar:date}', 5)" may also be written as "${hivevar:date}−5".

For example, if the given parameter "${hivevar:date}" is 2019-01-01, the SQL script shown in Table 1 becomes the SQL script shown in Table 2:

TABLE 2

```
insert overwrite table data1 partition ('date' = '2019 -01-01')
select
    user_id,
    count(*) cnt
from data0
where 'date' between date-sub('2019-01-01', 5) and '2019-01-01'
group by
    user_id
```

"date_sub('2019-01-01', 5)" in Table 2 is 2018-12-27, and the SQL script in Table 2 may also be represented as the SQL script shown in Table 3:

TABLE 3

```
insert overwrite table data1 partition ('date' = '2019-01-01')
select
    user_id,
    count(*) cnt
from data0
where 'date' between '2018-12-27' and '2019-01-01'
group by
    user_id
```

Step S204: generating, according to the syntax trees, the data dependency relationships, between the data partitions of the source tables and the data partitions of the target tables, which are based on a middle variable.

On the basis of the SQL script shown in Table 1, the source table of the task is data0 and the target table is data1, the target table data1 depends on the source table data0. The depended data partition in the source table data 0 is "date between date_sub('${hivevar:date}', 5) and '${hivevar:date}'". The affected data partition in the target table data1 is "date='${hivevar:date}'". Therefore, for any one data partition in the source table data0, date=D0, and for any one data partition in the target table data1, date=D1. It can be obtained that the dependency relationship between the data partition of the source table and the data partition of the target table is as follow, where the dependency relationship is based on a middle variable "${hivevar:date}":

D0 between date_sub('${hivevar:date}', 5) and '${hivevar:date}'

The dependency relationship may be converted into:
D0>='${hivevar:date}'−5 and D0<='${hivevar:date}'
which may further be converted into:
D0+5>='${hivevar:date}' and D0<='${hivevar:date}'
which may further be converted into:
'${hivevar:date}'>=D0 and '${hivevar:date}'<=D0+5

In this embodiment, according to the data dependency relationship between the data partition of the source table and the data partition of the target table based on the middle variable, the data partition of the source table and the middle variable may be in a one-to-one relationship or a one-to-many relationship.

For example. for D0='${hivevar:date}', the data partition date=D1 corresponds a value of one middle variable, that is the value of '${hivevar:date}'. For D0>='${hivevar:date}'−1 and D0<='${hivevar:date}', the data partition date=D1 correspond to values of two middle variables, that is, the values of '${hivevar:date}'−1 and '${hivevar:date}'.

In addition, in some cases, one data partition of the source table corresponds to values of an infinite number of intermediate variables. For example, a dependency relationship of a semi-open interval with a critical point, such as D0<=${hivevar:date}, and the like.

As an optional step, after the data dependency relationship between the data partition of the source table and the data partition of the target table based on the middle variable is generated, the middle variable may be eliminated to generate a direct data dependency relationship between the data partition of the source table and the data partition of the target table.

On the basis of the SQL script shown in Table 1, D1='${hivevar:date}' is substituted into the dependency relationship obtained through conversion in step S204 above, and the intermediate variable "${hivevar:date}" is eliminated, to obtain the direct data dependency relationship between the data partition of the source table and the data partition of the target table:

```
D1 >= D0 and D1 <= date_add(D0, 5)
    or, D0 >= date_sub(D1, 5) and D0 <= D1.
```

Then, for the data in the data partition '2018-12-27' in data0:
D1>='2018-12-27' and D1<='2019-01-01'
that is, the data partitions date='2018-12-27'~'2019-01-01' in the data1 are all related thereto, and if the data of the day 2018-12-27 in the data0 appears or changes, the data of the days 2018-12-27~2019-01-01 needs to be re-calculated or updated.

Further, when a new task needs to be added, the user can upload a task script of the newly added target task. For the task script of the newly added target task, the data dependency relationship between the source table and the target table in the target task is generated using the manner of above steps S202-S205.

When adding a new task, the developer only needs to upload the SQL script of the task, and the orchestrator will automatically detect the task script, analyze the data dependency relationship in the task, and automatically trigger the execution of the task when needed.

Further, the user can update the task script of the task at any time. After the task script of any task is updated, the data dependency relationship between the source table and the target table in the task is updated in the manner of the above steps S202-S204.

When updating an existing task, the developer only needs to modify the SQL script of the task, and the orchestrator will automatically detect that the task script is updated, re-analyze the data dependency relationship in the task, and automatically trigger the execution of the task when needed.

In addition, if there is no data dependency relationship between the source table and the target table in the task, the task has no data dependency relationship with other tasks and can be executed in any order.

Optionally, for a task that does not have any data dependency relationship between the source table and the target table, the orchestrator can display the task, and a technical person specifies an upstream task and a downstream task of the task, thereby determining the execution order of the task. The upstream task of the task refers to the task executed before the task, and the downstream task refers to the task executed after the task. After the execution of the upstream task is completed, the execution of the task is triggered. After the execution of the task is completed, the execution of the downstream task is triggered.

Step S205: driving execution of tasks in a data-driven manner, according to the data dependency relationships between the source tables and the target tables of the tasks.

In this embodiment, the tasks are not orchestrated in a manner of defining a workflow, instead, a data-driven manner is used to trigger execution of respective tasks to implement the task orchestrating.

For each task, when the data in the data partition of the source table of the task changes, it means that the input data of the task is ready, which triggers the execution of the task. And the execution of the task causes the data in the data partition of the target table to change, and the data partition of the target table will be used as a data partition of a source table of a next task, which continues to trigger the execution of the next task.

In this embodiment, the target table of the task may be one or more. The source table of the task may be one or more, and each source table may correspond to one or more depended data partitions. That the data partition of the source table changes refers to at least one depended data partition in the source table changes.

In this embodiment, the driving the execution of the tasks in the data-driven manner may be specifically implemented in the manner as following:

A data partition in a database is periodically scanned. For a current data partition scanned, an associated task of the current data partition and the data partition of the target table of the associated task are determined, where the associated task is a task that uses the current data partition as the data partition of the source table. The execution of the associated task is triggered, according to an update time of the current data partition and an update time of the data partition of the target table of the associated task.

Optionally, whether the data in each data partition changes may be detected in real time, and when it is detected that the data in a certain data partition changes, that data partition is used as the current data partition. The associated task of the current data partition and the data partition of the target table of the associated task are determined, where the associated task is a task that uses the current data partition as the data partition of the source table. The execution of the associated task is triggered, according to an update time of the current data partition and an update time of the data partition of the target table of the associated task.

Specifically, the triggering the execution of the associated task, according to an update time of the current data partition and an update time of the data partition of the target table of the associated task includes:

determining whether the update time of the current data partition is later than the update time of at least one data partition of the target table of the associated task; triggering the execution of the associated task, if the update time of the current data partition is later than the update time of at least one data partition of the target table; not triggering the execution of the associated task, if the update time of the current data partition is not later than the update time of any data partition of the target table.

Further, if the update time of the current data partition is later than the update time of at least one data partition of the target table, before the triggering the execution of the associated task, further include: determining whether the current data partition is a data partition of the target table of the associated task at the same time; not triggering the execution of the associated task, if the current data partition is the data partition of the target table of the associated task at the same time;

triggering the execution of the associated task, if the current data partition is not the data partition of the target table of the associated task, and if there is only one source table of the associated task;

determining whether other source table(s) of the current data partition directly or indirectly depends on the source table to which the current data partition belongs, if the current data partition is not the data partition of the target table of the associated task and if there are multiple source tables of the associated task; not triggering the execution of the task, if at least one of the other source table(s) directly or indirectly depends on the source table to which the current data partition belongs; triggering the execution of the task, if none of the other source table(s) directly or indirectly depends on the source table to which the current data partition belongs.

Specifically, if the current data partition is the data partition of the target table of the associated task at the same time, it means that the source table to which the current data partition belongs is a target table of the associated task, which means that the source table has a self-dependency relationship that will be ignored, and the execution of the task is not triggered.

Figure 3:
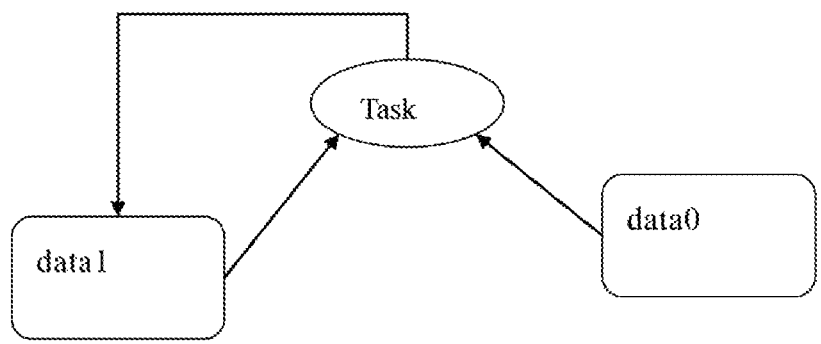
FIG. 3 is a schematic diagram of a self-dependency relationship according to Embodiment 2 of the present disclosure.

For example, as the dependency relationship shown in FIG. 3, the table data0 is the source table of the task, and the table data1 is both the source table and the target table of the task, and the table data1 has a self-dependency relationship. In this case, the data partition of the table data1 that is used as the input data of the task and the data partition of the table data1 that is used as the output data of the task are generally different data partitions in the data1. In this case, the data1 is generally a certain type of cumulative table, and the new data in the data0 is accumulated into data1 each time. Therefore, the change of the data in the data partition in the data1 does not trigger the execution of the task, and the change of the data in the data0 will trigger the execution of the task.

In addition, if the current data partition is the data partition of the target table of the associated task at the same time, it means that the source table to which the source table belongs is a target table of the associated task. If the data partition of the source table that is used as the input data of the task and the data partition of the target table that is used as the output data of the task has a same data partition, it is determined that there is a circular dependency relationship, and the orchestrator may report an error so that a technical person verifies the script of the task and makes adjustments accordingly.

Further, if the current data partition is not the data partition of the target table of the associated task, that is, the source table to which the current data partition belongs is not the target table of the associated task, and if there is only one source table of the associated task, the execution of the associated task is triggered.

If the current data partition is not the data partition of the target table of the associated task, that is, the source table to which the current data partition belongs is not the target table of the associated task, if there are multiple source tables of the associated task, whether there is other source table(s) of the associated task directly or indirectly depending on the source table to which the current data partition belongs is determined. If there is other source table(s) of the associated task directly or indirectly depending on the source table to which the current data partition belongs, it means that the is a dependency relationship of multi-path dependency, and the execution of the task is not triggered.

Figure 4:
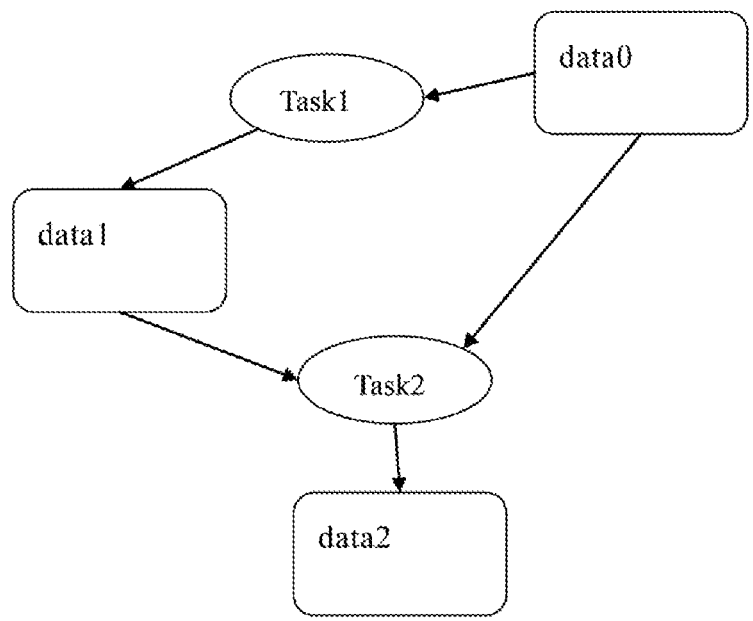
FIG. 4 is a schematic diagram of a multipath dependency relationship provided by Embodiment 2 of the present disclosure.

For example, as the data dependency relationship as shown in FIG. 4, if the data in the table data0 changes, a task 1 is triggered, if a task 2 is triggered at the same time, in this case, if there is no data in the table data1, since the dependency of the data2 to data1 is not satisfied, the task 2 will not be executed, and no error will occur. However, for update situation of the data0, the last data is already in the data1 table. At this time, if the data in the data partition of the table data0 changes, the task 1 and the task 2 are triggered at the same time. Then, the execution of the task 2 directly triggered by the table data0 is a waste, because soon the execution of the task 1 will cause the data of the data partition of the table data1 to update, and the task 2 is triggered to be executed again. Therefore, in this embodiment, before the data of the data partition of the table data0 changes to trigger the execution of the task 2, the orchestrator may determine that another source table data 1 directly depends on the table data0, at this time, the execution of the task 2 will not be triggered.

Optionally, for the case of the storage multipath dependency, the data dependency relationships between the data tables may be topology sorted to optimize the data dependency relationships of the data tables, thereby eliminating the situation of multipath dependency.

In addition, if the data in the data partition of any of the source tables of the tasks is missing, the execution of the task will not be triggered. Based on the needs of the business, a date range of the source table referenced by the target table is generally a reference to the past. Therefore, when such a data partition reference is defined, the execution of the corresponding task will be triggered only when data in all the depended data partitions in the source table are complete.

For example, a change of the data of 2018-12-27 in the source table data0 in the above example of this step does not directly trigger the calculation and update of the data of 2019-01-01 in the target table data1, because according to the dependency relationship: D1>=D0 and D1<=date_add (D0, 5), the data of 2019-01-01 in the target table data1 has the following dependencies: D0>=2018-12-27 and D0<=2019-01-01. At present, if only the data of 2018-12-27 in the data0 exists, and the data for 2018-12-28~2019-01-01 does not exist, the task of calculating the data of 201901-01 in the data1 will not be triggered.

In this embodiment, after the data dependency relationship between the data partition of the source table and the data partition of the target table based on the middle variable is generated, the execution of the task is driven in the data-driven manner according to the data dependency relationship between the data partition of the source table and the data partition of the target table based on the middle variable.

Specifically, a task instance is created for each value of the middle variable and the task script according to the value of the middle variable and the task script, to trigger the execution of the task instance.

In addition, in a situation where the data partition of the source table in the task corresponds to an infinite number of the values of the middle variables, the data update of the data partition of the source table will not trigger the execution of the task; or, a task instance is created for the values of a limited number of middle variables according to the actual business logic, and the execution of the task instance is triggered.

For example, for a dependency relationship of a semi-open interval with a critical point, the execution of the task is triggered only when the data of the data partition corresponding to the critical point changes.

Optionally, at the same time, as the final destination of the flow of data in the big data platform, the task of generating the data report can also be integrated. When the data table on which the data report depends changes, the task of automatically generating the data report is triggered, or the report mail task is automatically transmitted.

In the embodiments of the present disclosure, the task scripts are edited as descriptive language scripts, and the data dependency relationships between the source tables and the target tables in the tasks corresponding to the task scripts are automatically generated according to the descriptive language scripts of the tasks. The execution of the tasks is driven in a data-driven manner according to the data dependency relationships between the source tables and the target tables in the tasks. There is no need for a technical person to manually edit the workflow file. When some tasks change, the data dependency relationships between the source and target tables in the tasks can be automatically updated according to the task scripts, without affecting the orchestration process between tasks, and there is no need to re-perform the task orchestration test, which improves the efficiency of the task orchestrating.

Embodiment 3

Figure 5:
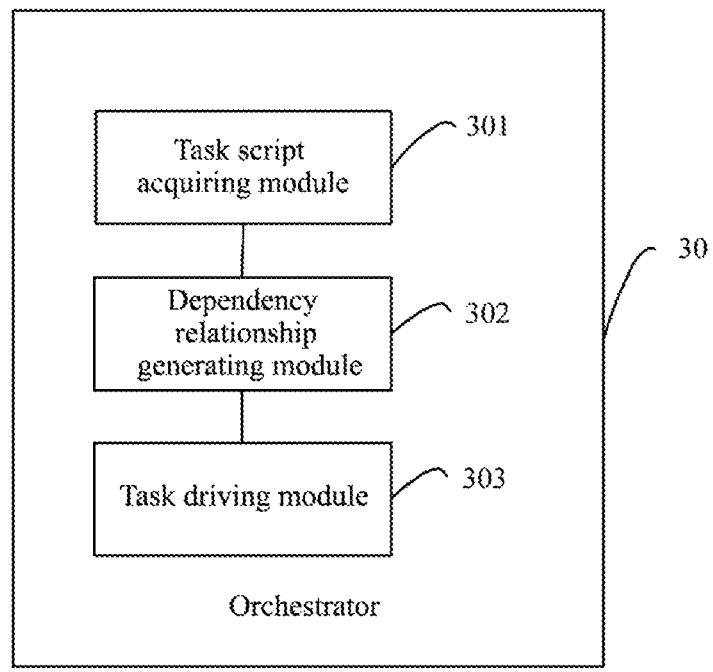
FIG. 5 is a schematic structural diagram of an orchestrator according to Embodiment 3 of the present disclosure.

FIG. 5 is a schematic structural diagram of an orchestrator according to Embodiment 3 of the present disclosure. The orchestrator according to this embodiment of the present disclosure can execute the processing flow provided by the embodiments of the method for task orchestrating. As shown in FIG. 5, the orchestrator 30 includes: a task script acquiring module 301, a dependency relationship generating module 302 and a task driving module 303.

Specifically, the task script acquiring module 301 is configured to acquire task scripts, where the task scripts are descriptive language scripts.

The dependency relationship generating module 302 is configured to automatically generate data dependency relationships between source tables and target tables in tasks corresponding to the task scripts, according to the task scripts.

The task driving module 303 is configured to drive execution of tasks in a data-driven manner, according to the data dependency relationships between the source tables and the target tables of the respective tasks.

The device according to this embodiment of the present disclosure may be specifically configured to perform the method embodiment provided in the foregoing Embodiment 1, and specific functions are not described herein again.

In this embodiment of the present disclosure, the task scripts are edited as descriptive language scripts, and the data dependency relationships between the source tables and the target tables in the tasks corresponding to the task scripts are automatically generated according to the descriptive language scripts of the tasks. The execution of the tasks is driven in a data-driven manner according to the data dependency relationships between the source tables and the target tables in the tasks. There is no need for a technical person to manually edit the workflow file. When some tasks change, the data dependency relationships between the source and target tables in the tasks can be automatically updated according to the task scripts, without affecting the orchestration process between tasks, and there is no need to re-perform the task orchestration test, which improves the efficiency of the task orchestrating.

Embodiment 4

On the basis of the above Embodiment 3, in this embodiment, the dependency relationship generating module of the orchestrator is further configured to:

extract, from syntax trees of the task scripts, data partitions of the source tables that serve as input data of corresponding tasks, and data partitions of the target tables that serve as output data of the corresponding tasks, where the data partitions of the target tables depend on the data partitions of the source tables; and generate the data dependency relationships between the data partitions of the source tables and the data partitions of the target tables that are based on a middle variable, according to the syntax trees.

Optionally, the task driving module is further configured to:

periodically scan a data partition in a database, and for a current data partition that is scanned, an associated task of the current data partition and the data partition of the target table of the associated task are determined, where the associated task is a task that uses the current data partition as the data partition of the source table; trigger execution of the associated task, according to an update time of the current data partition and an update time of the data partition of the target table of the associated task.

Optionally, the task driving module is further configured to:

determine whether the update time of the current data partition is later than the update time of at least one data partition of the target table of the associated task; trigger the execution of the associated task, if the update time of the current data partition is later than the update time of at least one data partition of the target table; not trigger the execution of the associated task, if the update time of the current data partition is not later than the update time of any data partition of the target table.

Optionally, the task driving module is further configured to:

determine whether the current data partition is the data partition of the target table of the associated task at the same time, if the update time of the current data partition is later than the update time of at least one data partition of the target table; not trigger the execution of the associated task, if the current data partition is the data partition of the target table of the associated task at the same time; trigger the execution of the associated task, if the current data partition is not the data partition of the target table of the associated task, and if there is only one source table of the associated task.

Optionally, the task driving module is further configured to:

determine whether other source table(s) of the current data partition directly or indirectly depends on the source table to which the current data partition belongs, if the current data partition is not the data partition of the target table of the associated task and there are multiple source tables of the associated task; not trigger the execution of the task, if at least one of the other source table(s) directly or indirectly depends on the source table to which the current data partition belongs; trigger the execution of the task, if none of the other source table(s) directly or indirectly depends on the source table to which the current data partition belongs.

Optionally, the dependency relationship generating module is further configured to:

topology sort data dependency relationships among the data tables.

Optionally, the dependency relationship generating module is further configured to:

for a task script of a newly added target task, generate a data dependency relationship between a source table and a target table in the target task.

Optionally, the dependency relationship generating module is further configured to:

after a task script of any one task is updated, updating the data dependency relationships between the source tables and the target tables in the tasks.

The device according to this embodiment of the present disclosure may be specifically configured to perform the method embodiment provided in the foregoing Embodiment 2, and specific functions are not described herein again.

In this embodiment of the present disclosure, the task scripts are edited as descriptive language scripts, and the data dependency relationships between the source tables and the target tables in the tasks corresponding to the task scripts are automatically generated according to the descriptive language scripts of the tasks. The execution of the tasks is driven in a data-driven manner according to the data dependency relationships between the source tables and the target tables in the tasks. There is no need for a technical person to manually edit the workflow file. When some tasks change, the data dependency relationships between the source and target tables in the tasks can be automatically updated according to the task scripts, without affecting the orchestration process between tasks, and there is no need to re-perform the task orchestration test, which improves the efficiency of the task orchestrating.

Embodiment 5

Figure 6:
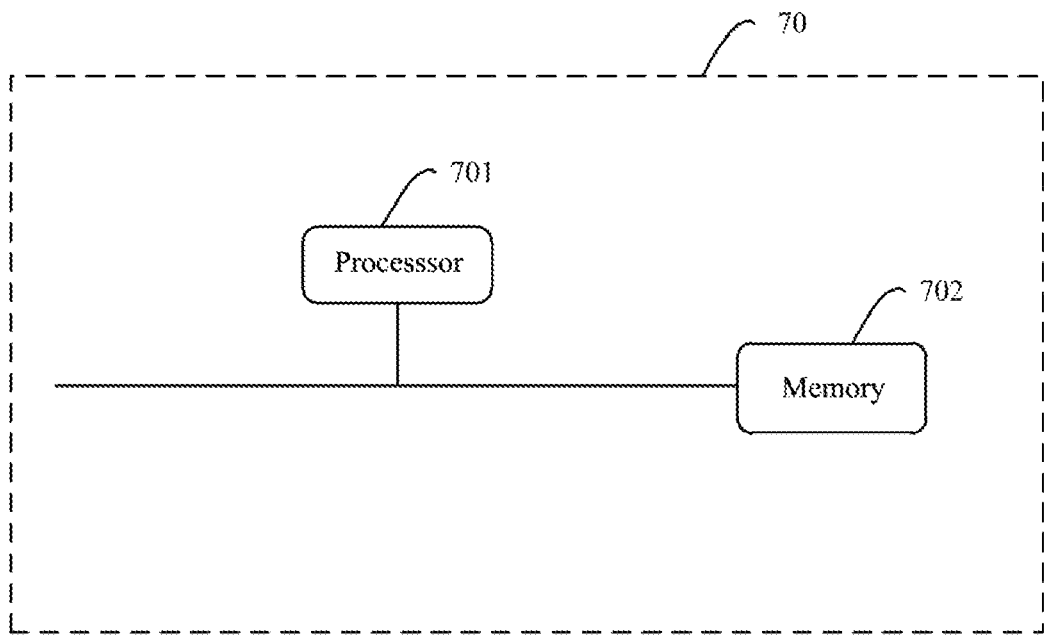
FIG. 6 is a schematic structural diagram of a device for task orchestrating according to Embodiment 5 of the present disclosure.

FIG. 6 is a schematic structural diagram of a device for task orchestrating according to Embodiment 5 of the present disclosure. As shown in FIG. 6, the device for task orchestrating 70 includes: a processor 701, a memory 702 and a computer program stored on the memory 702 and executable on the processor 701;

where, the processor 701, when executing the computer program, implements the method for task orchestrating according to the any one of the method embodiments as described above.

In this embodiment of the present disclosure, the task scripts are edited as descriptive language scripts, and the data dependency relationships between the source tables and the target tables in the tasks corresponding to the task scripts are automatically generated according to the descriptive language scripts of the tasks. The execution of the tasks is driven in a data-driven manner according to the data dependency relationships between the source tables and the target tables in the tasks. There is no need for a technical person to manually edit the workflow file. When some tasks change, the data dependency relationships between the source and target tables in the tasks can be automatically updated according to the task script, without affecting the orchestration process between tasks, and there is no need to re-perform the task orchestration test, which improves the efficiency of the task orchestrating.

In addition, an embodiment of the present disclosure further provides a computer readable storage medium having a computer program stored thereon, where the computer program, when being executed by the processor, implements the method for task orchestrating according to any one of the method embodiments.

In the embodiments according to the present disclosure, it should be understood that the disclosed apparatuses and methods may be implemented in other manners. For example, the apparatus embodiments described above are merely illustrative. For example, the division of the unit is only a division of logical functions. In actual implementations, there may be another division manner, for example, multiple units or components may be combined or integrated into another system, or some features can be omitted or not executed. In addition, the mutual coupling or direct coupling or communication connection shown or discussed may be an indirect coupling or communication connection through some interfaces, devices or units, and may be in an electrical, a mechanical or other form.

The units described as separate components may or may not be physically separated, and the components illustrated as units may or may not be physical units, that is, may be located in one place, or may be distributed to multiple network units. Some or all of the units may be selected according to actual needs to achieve the purpose of the solutions of the embodiment.

In addition, various functional units in various embodiments of the present disclosure may be integrated into one processing unit, or various units may exist physically separately, or two or more units may be integrated into one unit. The above integrated units may be implemented in the form of hardware or in the form of hardware and software functional units.

The above-described integrated unit implemented in the form of a software functional unit can be stored in a computer readable storage medium. The above software functional unit is stored in a storage medium and includes several instructions to cause a computer device (which may be a personal computer, a server, or a network device, etc.) or a processor to perform some of the steps of the methods of the various embodiments of the present disclosure. The above-mentioned storage medium includes: a U disk, a mobile hard disk, a read-only memory (ROM), a random access memory (RAM), a magnetic disk, or an optical disk, etc., which can store program codes.

A person skilled in the art can clearly understand that for the convenience and brevity of the description, the division of each functional module described above is only for exemplifying. In practical applications, the above functions may be assigned to be implemented by different functional modules as needed, that is, the internal structure of the apparatus is divided into different functional modules to perform all or part of the functions described above. For the specific working processes of the apparatuses described above, reference can be made to the corresponding processes in the foregoing method embodiments, which will not be repeated herein.

Other embodiments of the disclosure are readily apparent to those skilled in the art, after the specification is taken into account and the disclosure disclosed herein is practiced. The present disclosure is intended to cover any variations, uses, or adaptations of the present disclosure, which are in accordance with the general principles of the disclosure and include common knowledge or common technical means in the art that are not disclosed in the present disclosure. The specification and embodiments are regarded as illustrative only, the true scope and spirit of the disclosure are pointed out by the following claims.

It should be understood that, the present disclosure is not limited to the specific structures described above and illustrated in the drawings, and various modifications and changes can be made without departing from the scope thereof. The scope of the disclosure is limited only by the appended claims.

What is claimed is:

1. A method of task orchestration for data processing, wherein the method is executed by an orchestrator and comprises:

acquiring task scripts, wherein the task scripts are descriptive language scripts;

automatically generating data dependency relationships between source tables and target tables in tasks corresponding to the task scripts according to the task scripts;

generating a data-driven trigger chain of the tasks according to the data dependency relationships between the source tables and the target tables of the tasks, wherein a beginning of the data-driven trigger chain is original data;

driving execution of the tasks according to the data-driven trigger chain, wherein automatically generating the data dependency relationships between the source tables and the target tables in the tasks corresponding to the task scripts according to the task scripts comprises:

extracting, from syntax trees of the task scripts, data partitions of the source tables that serve as input data of corresponding tasks, and data partitions of the target tables that serve as output data of the corresponding tasks, wherein the data partitions of the target tables depend on the data partitions of the source tables; and generating the data dependency relationships between the data partitions of the source tables and the data partitions of the target tables based on a middle variable according to the syntax trees.

2. The method according to claim 1, wherein, driving the execution of tasks in the data-driven manner, according to the data dependency relationships between the source tables and the target tables of the tasks, further comprises:

periodically scanning a data partition in a database for a current data partition that is scanned;

determining an associated task of the current data partition and a data partition of a target table of the associated task, wherein the associated task is a task that uses the current data partition as a data partition of a source table; and triggering execution of the associated task, according to an update time of the current data partition and an update time of the data partition of the target table of the associated task.

3. The method according to claim 2, wherein, triggering the execution of the associated task, according to the update time of the current data partition and the update time of the data partition of the target table of the associated task, further comprises:

determining whether the update time of the current data partition is later than the update time of at least one data partition of the target table of the associated task;

triggering the execution of the associated task, when the update time of the current data partition is later than the update time of the at least one data partition of the target table; and not triggering the execution of the associated task, when the update time of the current data partition is not later than the update time of any data partition of the target table.

4. The method according to claim 3, wherein, triggering the execution of the associated task, when the update time of the current data partition is later than the update time of the at least one data partition of the target table, further comprises:

determining whether the current data partition is a data partition of the target table of the associated task at the same time, when the update time of the current data partition is later than the update time of the at least one data partition of the target table;

not triggering the execution of the associated task, when the current data partition is a data partition of the target table of the associated task at the same time; and triggering the execution of the associated task, when the current data partition is not a data partition of the target table of the associated task, and when there is only one source table of the associated task.

5. The method according to claim 4, wherein, after determining whether the current data partition is the data partition of the target table of the associated task at the same time, the method further comprises:

determining whether at least one other source table of the current data partition directly or indirectly depends on the source table to which the current data partition belongs, when the current data partition is not the data partition of the target table of the associated task and when there are multiple source tables of the associated task;

not triggering the execution of the task, when the at least one other source table directly or indirectly depends on the source table to which the current data partition belongs; and triggering the execution of the task, when none of the at least one other source table directly or indirectly depends on the source table to which the current data partition belongs.

6. The method according to claim 1, wherein, after automatically generating the data dependency relationships between the source tables and the target tables in the tasks corresponding to the task scripts, according to the task scripts, the method further comprises:

topology sorting data dependency relationships among the data tables.

7. The method according to claim 1, wherein, after automatically generating the data dependency relationships between the source tables and the target tables in the tasks, according to the task scripts, the method further comprises:

for a task script of a newly added target task, generating a data dependency relationship between a source table and a target table in the newly added target task.

8. The method according to claim 1, wherein, after automatically generating the data dependency relationships between the source tables and the target tables in the tasks, according to the task scripts, the method further comprises:

after a task script of any one task is updated, updating the data dependency relationships between the source tables and the target tables in the tasks.

9. An orchestrator for data processing, comprising:

a processor, a memory, and a computer program stored on the memory and executable on the processor, wherein the computer program, when being executed by the processor, causes the processor to:

acquire task scripts, wherein the task scripts are descriptive language scripts;

automatically generate data dependency relationships between source tables and target tables in tasks corresponding to the task scripts according to the task scripts;

generate a data-driven trigger chain of the tasks according to the data dependency relationships between the source tables and the target tables of the tasks, wherein a beginning of the data-driven trigger chain is original data;

drive execution of the tasks according to the data-driven trigger chain, wherein the computer program, when being executed by the processor, further causes the processor to:

extract, from syntax trees of the task scripts, data partitions of the source tables that serve as input data of corresponding tasks, and data partitions of the target tables that serve as output data of the corresponding tasks, wherein the data partitions of the target tables depend on the data partitions of the source tables; and generate the data dependency relationships between the data partitions of the source tables and the data partitions of the target tables based on a middle variable according to the syntax trees.

10. The device according to claim 9, wherein, the computer program, when being executed by the processor, further causes the processor to:

periodically scan a data partition in a database for a current data partition that is scanned;

determining an associated task of the current data partition and a data partition of a target table of the associated task, wherein the associated task is a task that uses the current data partition as a data partition of a source table; and trigger execution of the associated task, according to an update time of the current data partition and an update time of the data partition of the target table of the associated task.

11. The device according to claim 10, wherein, the computer program, when being executed by the processor, further causes the processor to:

determine whether the update time of the current data partition is later than the update time of at least one data partition of the target table of the associated task;

trigger the execution of the associated task, when the update time of the current data partition is later than the update time of the at least one data partition of the target table; and not trigger the execution of the associated task, when the update time of the current data partition is not later than the update time of any data partition of the target table.

12. The device according to claim 11, wherein, the computer program, when being executed by the processor, further causes the processor to:

determine whether the current data partition is a data partition of the target table of the associated task at the same time, when the update time of the current data partition is later than the update time of the at least one data partition of the target table;

not trigger the execution of the associated task, when the current data partition is a data partition of the target table of the associated task at the same time; and trigger the execution of the associated task, when the current data partition is not a data partition of the target table of the associated task, and when there is only one source table of the associated task.

13. The device according to claim 12, wherein, the computer program, when being executed by the processor, further causes the processor to:

determine whether at least one other source table of the current data partition directly or indirectly depends on the source table to which the current data partition belongs, when the current data partition is not a data partition of the target table of the associated task and when there are multiple source tables of the associated task;

not trigger the execution of the task, when the at least one other source table directly or indirectly depends on the source table to which the current data partition belongs; and trigger the execution of the task, when none of the at least one other source table directly or indirectly depends on the source table to which the current data partition belongs.

14. The device according to claim 9, wherein, the computer program, when being executed by the processor, further causes the processor to:

topology sort data dependency relationships among the data tables.

15. The device according to claim 9, wherein, the computer program, when being executed by the processor, further causes the processor to:

for a task script of a newly added target task, generate a data dependency relationship between a source table and a target table in the newly added target task.

16. The device according to claim 9, wherein, the computer program, when being executed by the processor, further causes the processor to:

after a task script of any one task is updated, update the data dependency relationships between the source tables and the target tables in the tasks.

17. A non-transitory computer readable storage medium having a computer program stored thereon, wherein the computer program, when executed by a processor of an orchestrator for data processing, causes the orchestrator to:

acquire task scripts, wherein the task scripts are descriptive language scripts;

automatically generate data dependency relationships between source tables and target tables in tasks corresponding to the task scripts according to the task scripts;

generate a data-driven trigger chain of the tasks according to the data dependency relationships between the source tables and the target tables of the tasks, wherein a beginning of the data-driven trigger chain is original data;

drive execution of the tasks according to the data-driven trigger chain, wherein the computer program, when being executed by the processor, further causes the processor to:

extract, from syntax trees of the task scripts, data partitions of the source tables that serve as input data of corresponding tasks, and data partitions of the target tables that serve as output data of the corresponding tasks, wherein the data partitions of the target tables depend on the data partitions of the source tables; and generate the data dependency relationships between the data partitions of the source tables and the data partitions of the target tables based on a middle variable according to the syntax trees.

\* \* \* \* \*